United States Patent
Shulgin

(10) Patent No.: US 9,656,109 B1
(45) Date of Patent: May 23, 2017

(54) PROCESS FOR PREPARATION OF A GRANULAR HUMIC MINERAL REAGENT

(71) Applicant: OrganoCat, LLC, Louisville, KY (US)

(72) Inventor: Alexander I. Shulgin, Louisville, KY (US)

(73) Assignee: ORGANOCAT, LLC, Louisville, KY (US)

( * ) Notice: Subject to any disclaimer, the term of this patent is extended or adjusted under 35 U.S.C. 154(b) by 0 days.

(21) Appl. No.: 14/669,858

(22) Filed: Mar. 26, 2015

Related U.S. Application Data

(60) Provisional application No. 62/049,656, filed on Sep. 12, 2014.

(51) Int. Cl.
| | | |
|---|---|---|
| *B01J 20/24* | (2006.01) | |
| *C05B 3/00* | (2006.01) | |
| *C05F 11/00* | (2006.01) | |
| *C05F 11/02* | (2006.01) | |
| *C05C 1/00* | (2006.01) | |
| *C05C 9/00* | (2006.01) | |
| *C05C 3/00* | (2006.01) | |
| *C05C 5/02* | (2006.01) | |
| *C05B 1/02* | (2006.01) | |
| *C05B 7/00* | (2006.01) | |
| *A62D 3/30* | (2007.01) | |
| *B09C 1/08* | (2006.01) | |

(52) U.S. Cl.
CPC ............... *A62D 3/30* (2013.01); *B01J 20/24* (2013.01); *B09C 1/08* (2013.01); *C05B 1/02* (2013.01); *C05B 3/00* (2013.01); *C05B 7/00* (2013.01); *C05C 1/00* (2013.01); *C05C 3/00* (2013.01); *C05C 5/02* (2013.01); *C05C 9/00* (2013.01); *C05F 11/00* (2013.01); *C05F 11/02* (2013.01)

(58) Field of Classification Search
None
See application file for complete search history.

(56) References Cited

U.S. PATENT DOCUMENTS

| | | | | |
|---|---|---|---|---|
| 3,111,404 A * | 11/1963 | Karcher | C05F 11/02 | 71/24 |
| 3,377,152 A * | 4/1968 | Karcher | C05F 11/00 | 562/405 |
| 3,544,296 A * | 12/1970 | Karcher | C05F 11/00 | 71/24 |
| 3,617,237 A * | 11/1971 | Nagasawa | B01J 2/00 | 23/313 R |
| 3,770,411 A * | 11/1973 | Chambers | C05B 7/00 | 71/24 |
| 4,237,101 A | 12/1980 | Willard, Sr. | | |
| 4,743,287 A * | 5/1988 | Robinson | C05F 3/00 | 71/12 |
| 4,846,870 A * | 7/1989 | Weltzien | C05F 11/00 | 71/11 |
| 4,919,702 A * | 4/1990 | Weltzien | C05F 11/00 | 71/11 |
| 5,393,317 A * | 2/1995 | Robinson | C05F 3/00 | 71/12 |
| 6,056,801 A * | 5/2000 | Parent | C05B 7/00 | 71/24 |
| 7,204,660 B2 * | 4/2007 | Shulgin | B09C 1/08 | 405/128.75 |
| 8,375,629 B2 * | 2/2013 | Prasad | C05G 1/00 | 47/57.6 |
| 8,636,822 B1 * | 1/2014 | Boyce | C05B 7/00 | 71/11 |
| 2003/0167811 A1* | 9/2003 | Porubcan | C05B 1/00 | 71/6 |
| 2004/0020107 A1 | 2/2004 | Chapman | | |
| 2005/0039509 A1* | 2/2005 | Muma | C05B 7/00 | 71/24 |
| 2005/0268679 A1* | 12/2005 | Josef | C05B 7/00 | 71/31 |
| 2007/0051148 A1* | 3/2007 | Terenzio | C05F 11/02 | 71/24 |
| 2010/0251790 A1* | 10/2010 | Van Rooijen | C05F 11/04 | 71/24 |
| 2012/0272701 A1* | 11/2012 | Dementjev | C05F 11/02 | 71/24 |
| 2013/0227998 A1* | 9/2013 | Copplestone | C05B 17/00 | 71/24 |

\* cited by examiner

*Primary Examiner* — Wayne Langel
(74) *Attorney, Agent, or Firm* — Middleton Reutlinger; John F. Salazar

(57) ABSTRACT

A process for preparing humic-mineral agent granules is disclosed. Such a process may comprise providing a humic acid-containing material; crushing the humic acid-containing material to obtain first granules; contacting a quantity of water with the first granules, thereby forming slightly wet granules; blending the slightly wet granules for a period of time, thereby forming blended granules; contacting an amount of alkali with the blended granules, thereby forming alkali-treated granules; and mixing the alkali-treated granules at a temperature high enough to melt organic carbon substances in the alkali-treated granules. The resulting product has biologically, geologically, and chemically active properties, and may be applied to the soil alone or in combination with a commercially available fertilizer. Additionally, the resulting product may be used to detoxify solid or liquid waste products.

15 Claims, No Drawings

PROCESS FOR PREPARATION OF A GRANULAR HUMIC MINERAL REAGENT

CROSS-REFERENCE TO RELATED APPLICATIONS

Priority is claimed on the basis of U.S. Provisional Application No. 62/049,656, filed on 12 Sep. 2014.

FIELD OF THE INVENTION

Generally, a process for the manufacturing or production of solid humic-mineral preparations, sorbents, flocculants, coagulants, ameliorants, soil conditioners, soil and turf rebuilders, fertilizers, and bio-stimulants is disclosed. Additionally, a solid product of such a humic-mineral preparation, with surface-active, ion-exchange, chelating, complexing, and biologically, geologically, and chemically active properties is disclosed.

BACKGROUND OF THE INVENTION

It is well known in the art that humic acid-based preparations can have a variety of beneficial properties and uses in agriculture (e.g. fertilizers, additives, etc.), waste water treatment and waste detoxification. However, these preparations also have a number of limitations. These preparations are often labor and energy intensive to produce, costly, and often result in products that are difficult to handle.

One such preparation, used as a sorbent for binding ions of heavy metals, is difficult to produce, comprising several steps, including extracting, neutralizing, filtering, washing, drying, and calcining. The large number of complex steps make the resulting sorbent product time consuming and expensive to produce.

Another such preparation requires the starting humic acid containing mixture to be dried or dehydrated to a moisture content from 6% to 12%. However, a moisture content this low results in the humic acids, or derivatives thereof, to be placed into a dormant or inactive state.

Another known preparation of concentrated humic product requires preparation by an electrolysis method. This method makes controlling the exact composition of the product difficult. Further, the resulting humic acids-based product is of a gelatinous consistency, making it difficult to handle for storage, transportation, and application.

Another known method of production of a humic mineral agent uses a method that requires the use of a large amount of water to hydrate the humic acids-containing starting material. This hydration results in a product that is the consistency of a viscous flowing liquid which is then converted into a plastic media. Such a process is energy intensive. Further, the adhesiveness of the product resulting from such a method makes bagging the product very difficult and labor intensive. The adhesiveness of the product also makes its use in fertilizer or in soil treatments difficult.

Therefore, there exists a need in the art for a process that produces a dry, granular, humic-mineral agent that does not have the limitations of adhesiveness. Further, there exists a need in the art for a process that minimizes the problems of intense energy use, high labor costs, and difficulty in handling of prior art processes.

SUMMARY

The present disclosure is generally related to production of solid humic-mineral preparations, sorbents, flocculants, coagulants, ameliorants, soil conditioners, soil and turf rebuilders, fertilizers, and bio-stimulants, as well as humic-mineral substances having surface-active, ion-exchange, chelating, complexing, and biologically, geologically, and chemically active properties. Generally, a process for such production may comprise providing a humic acid-containing material; crushing the humic acid-containing material to obtain first granules; contacting a quantity of water with the first granules, thereby forming slightly wet granules; blending the slightly wet granules for a period of time, thereby forming blended granules; contacting an amount of alkali with the blended granules, thereby forming alkali-treated granules; and mixing the alkali-treated granules at a temperature high enough to melt organic carbon series substances $C_nH_m$ in the alkali-treated granules. Embodiments of such a described process may use coal or peat as a humic acid-containing starting material. Such a humic acid-containing material may be crushed to obtain optimal (small) granules. In some embodiments such granules may be, for example, from about 1 to about 8 millimeters in size. Water may then added to such granules to make the surface of such granules slightly wet in order to avoid dust formation. An amount of water required may be determined relative to the natural moisture content of such a starting humic acid-containing material.

A dry alkali may then be mixed with such humic acid-containing granules, causing an exothermic reaction. Such mixing may continue until the temperature reaches at least 76° C., the resulting humic-mineral agent becomes dry, and the resulting humic-mineral granules have a pH between, for example, about 6 and about 12. In some embodiments, a dry alkali may be in the form of micro-beads or flakes. In some embodiments, a dry alkali may comprise sodium hydroxide, potassium hydroxide, or a combination of sodium hydroxide and potassium hydroxide.

In some embodiments, such a humic-mineral agent may be soluble and dispersible in water. In some embodiments, such a humic-mineral agent may be used in the preparation of a liquid humate solution.

In some embodiments, other steps may be included, such as an application of such a granular humic-mineral agent to soil, or mixing a particular-sized granular humic-mineral agent, for example, an optimal-sized granular humic-mineral agent, with a granular commercially available mineral fertilizer followed by application of such a homogenous mixture to soil. An optimal-sized granular humic mineral agent may have a size corresponding to a size of a granular mineral fertilizer, for example, from about 2 to about 5 millimeters in diameter. This may prevent segregation of humic-mineral agent from granular mineral fertilizer during storage, transportation and/or application.

In some embodiments, a process for preparation of a humic-mineral agent may comprise a step of adding nitrogen-, phosphorus, and/or potassium-bearing substances to such a granular humic-mineral agent, which has activated organic carbons series $C_nH_m$. In some embodiments, a nitrogen-bearing substance may comprise ammonium nitrate, urea, ammonium sulfate, potassium nitrate and/or sodium nitrate. In some embodiments, a phosphorus-bearing substance may comprise calcium phosphate, super phosphate, mono-di ammonium phosphate[G1], sodium phosphate, and/or potassium phosphate. In some embodiments, a potassium-bearing substance may comprise potassium chloride, potassium nitrate, and/or potassium sulfate.

Embodiments may include a step of mixing such a humic-mineral agent with toxic liquid material in order to detoxify the material, such as technological waste, process liquids, solutions, dispersions, and/or waste water.

In some embodiments, such a humic mineral agent may be used as a detoxification agent for solid or semi-solid toxic materials. Such a process may include mixing such a humic-mineral agent with water to form a slurry and then mixing the slurry with a solid or semi-solid material to be detoxified. In some embodiments, such a solid or semi-solid toxic material may comprise contaminated soil, dewatered sewage sludge, dewatered bottom sediment, compost, manure, bottom and/or fly ash, metal bearing slag, and/or waste product from mining.

It should be appreciated that all combinations of the foregoing concepts and additional concepts discussed in greater detail below provided such concepts are not mutually inconsistent are contemplated as being part of the subject matter disclosed herein. In particular, all combinations of claimed subject matter are contemplated as being part of the subject matter disclosed herein.

DETAILED DESCRIPTION

It should be understood that the phraseology and terminology used herein is for the purpose of description and should not be regarded as limiting. When used in this description and the claims as an adverb rather than a preposition, "about" means "approximately" and comprises the stated value and every value within 10% of that value; in other words, "about 100%" includes 90% and 110% and every value in between.

A process for making a humic-mineral agent may begin with obtaining a raw composition of humic acid-containing substance containing, for example, at least 25% naturally hydrated humic acids and, for example, an ash content of 30% or less. In addition, bulk and mobile forms of heavy metals in such a selected raw humic acids-containing substance may not exceed allowable concentrations for soils. A humic acid-containing starting material for producing a humic-mineral agent may comprise brown coal and/or peat. Coal and peat have been found to be composed of molecules of organic carbon represented by normal straight chain hydrocarbons having a carbon and hydrogen content from $C_{10}H_{22}$ to $C_{35}H_{72}$. Such hydrocarbon compounds may be strongly bonded with other components of carbon-series humates and caustobiolith, and, under normal conditions, they may be inert in terms of their biological and chemical activity. Such hydrocarbon compounds may have a melting temperature as high as 76° C. and an evaporative temperature as low as 173° C.

Once selected, a humic acid-containing starting material may be crushed and sieved such that granules, such as from about 1 to about 8 millimeters in diameter in size, may be obtained. Such granules may be mechanically mixed (e.g. auger, razors on the shaft, etc.) with just enough water to hydrate the surface of, the micro and macro cracks of, and the capillaries of the humic acid-containing granules for a short time, such as from about 2 to about 3 minutes. A moisture content that is too high may cause coal or peat to become sticky and to clump together and adhere to walls of equipment and/or other surfaces. However, a moisture content according to a process such as is described herein allows coal or peat to be available for crushing and sieving. Moisture content may be, for example, from about 10% to about 25%. Dry weight is measured as the difference between the total weight of the humic-containing granules and the weight of the moisture content of the humic-containing granules. Therefore, a quantity of water to be added may be determined based on moisture content and natural hydration of such a raw starting material, and such a quantity of water to be added may range between, for example, zero (for more naturally hydrated humic-containing material) and, for example, 40% (for less naturally hydrated humic containing material) of the dry weight of the granules.

Following hydration, an alkali, such as a dry alkali, may be added, for example, slowly added in small portions, to such hydrated granules, in an amount ranging from, for example, about 4.0% to about 18% of the dry weight of the humic-acid containing granules. Addition of a dry alkali may initiate an exothermic reaction, which may intensify hydrolysis of organic and mineral compounds and form humic-mineral agent granules. An addition of alkali greater than 18% of the dry weight of such hydrated humic acid-containing granules may cause a product with high alkalinity, which may be harmful for biological objects. An addition of alkali less than 4.0% of the dry weight of such hydrated humic acid-containing granules may result in slow humic acid hydrolyzing. Preliminary hydration of such hydrated humic acid containing granules allows for such granules to adsorb (and/or absorb) alkali at their surface, as such alkali is highly adhesive to and interactive with water. Preliminary hydration is undertaken to increase the likelihood of such adhesion and interaction, hydration; for example, adding alkali to a non-hydrated coal or peat may result in alkali beads and flakes passing through the bulk pore space of the coal or peat and accumulating on the bottom of the mixer without interaction with the coal or peat. Alkali, such as solid granulated and/or flaked alkali, may comprise, for example, sodium hydroxide, potassium hydroxide, or a mixture of sodium hydroxide and potassium hydroxide. Such alkali, such as solid granulated and/or flaked alkali, may be, for example, in the form of microbeads or flakes. Interaction of alkali with hydrated humic acid granules is exothermic and may result in rapid heating to temperatures as high as 120° C. The intensity of the reaction may be dependent on the amount of alkali added and the intensity of the mixing of the alkali and coal or peat granules. The greater the amount of alkali, the more rapid the temperature rise; the more intense the mixing, the more rapid the temperature rise. If too much alkali is added and/or the mixing too intense the temperature may rise too quickly, which may result in too much water evaporation, melting of organic carbon substances, and the fluidization of such melted organic carbon substances. Fluidization of organic substances may result in formation of large coal clumps (20 to 1000 millimeters), due to their extremely high adhesion under high temperature.

Slow and partial addition of dry alkali to such coal or peat hydrated granules, as well as controlling intensity of mixing, may prevent formation of such large clumps. A temperature at which such interaction between alkali and hydrated granules takes place may be, for example, about 76° C. Around 76° C., for example, organic carbon substances ($C_{10}H_{22}$ to $C_{35}H_{72}$) may melt, dissolve in humic acid, and form humic-mineral and mineral complexes, which may then later solidify during cooling. Such a process may disrupt to at least some degree initial bonds of humic acids, humic-minerals, mineral complexes, and organic carbon substances of the initial carbon series humates and caustobioliths. According to such a process, new bonds may form with a humic mineral agent resulting in activation of organic carbons, such that a product of such process may be able and available to accept and be involved in biological and chemical interactions. Due to evaporation of water and a maintenance of stable interaction temperature, for example, a temperature of about 76° C., granules according to such a process may maintain granular size and not clump together. Such mixing may continue for a period of time as long as is appropriate to mix, for example, essentially completely, or completely, added alkali with humic acid-containing granules and to evaporate excessive water. Such a process may result in conversion of coal or peat into granular humic mineral agent.

Once produced, such a humic-mineral agent may be transferred to a thermo-resistant bag while at a temperature of, for example, about 76° C. or lower. A reaction begun prior to such transfer may continue for, by way of example, from about 2 to about 3 days, during which time vapor may continue to be released. Such a continued reaction of such stationary bagged humic-mineral agent may avoid a need for long mixing times and may prevent formation of fine particles. Once reaction is complete the temperature of such stationary bagged humic-mineral agent may lower to ambient temperature, and such a resultant product is suitable for use and/or application. Such a resulting humic-mineral agent may be in solid form and may be less susceptible (than a liquid product) to degradation that might otherwise result from various physical and/or chemical insults such as solar (e.g., ultraviolet) radiation and/or alternate moistening and drying cycles.

Exothermically melted and resolidified organic carbons of raw humates and caustobioliths may be chemically bound to naturally and additionally hydrated and hydrolyzed humic acids. Resulting active organic carbons may be available to accept chemical and biological interaction, including ion-exchanging, complexing, chelating, flocculating, and/or coagulating. Additionally, acid groups of such a humic-mineral agent may be dissociated and in a hydrolyzed state where they may become water-soluble and water dispersible compounds. Due to such water solubility, such a granular humic-mineral agent, such as, for example, a dry granular humic-mineral agent, may be used in preparation of liquid humate products.

Such hydrated and/or hydrolyzed humic-mineral and/or mineral complexes may feature properties that may synergistically intensify effects of humic acids, a combination of which effects establishes a high physical and chemical activity potential of such a humic-mineral agent product. Such activity potential may in turn determine economically useful properties thereof. Such a resulting humic-mineral agent may include a combination of naturally hydrated humic acids and additionally hydrated and hydrolyzed humic-mineral and mineral components, having a pH value within safe limits for biological objects and a predetermined solid-liquid ratio.

A high chemical reactivity of such a humic-mineral agent may allow for addition of nitrogen-, phosphorus- and/or potassium-bearing substances to such a granular humic-mineral agent in order to enhance activated organic carbons. A nitrogen-bearing substance to be added may comprise ammonium nitrate, urea, ammonium sulfate, potassium nitrate and/or sodium nitrate. A phosphorus-bearing substance to be added may comprise calcium phosphate, super phosphate, mono-di-three ammonium phosphate (ammomium phosphates), sodium phosphate, and/or potassium phosphate. A potassium-bearing substance to be added may comprise potassium chloride, potassium nitrate, and/or potassium sulfate.

Organic carbon substances that have been melted and solidified and/or dissolved in humic acids create a highly efficient humic-mineral agent, which results in increased availability of carbon as an energy source for microorganisms in the soil. Such resulting hydrated and/or hydrolyzed humic acids, humic-mineral and mineral compounds, as well as activated organic carbon substances of such a humic-mineral agent, have an increased affinity for soil microbiota, as compared to raw brown coal (leonardite or lignite) and peat, and thus render a greater positive effect on growth, activity, and stability of native soil microbiota and plants. These beneficial effects result in better soil properties and function, and a greater crop yield, making application of such a humic-mineral agent to soil desirable. Such a granular humic-mineral agent may be applied to soil alone. Such a granular humic-mineral agent may be homogenously mixed with a commercially available mineral fertilizer prior to application to soil, in order, for example, to increase or change its effect. Such a homogenous mixture may be stored and/or transported as a mixture, or separately.

Such a humic-mineral agent may be used to detoxify solid toxic substances and/or liquid toxic substances. For detoxification of liquid waste or toxicants, a layer of granular humic-mineral agent may be prepared. Liquid waste or toxicant may then be poured over such a layer of humic-mineral agent granules, resulting in, for example, dissolution of such humic-mineral agent granules. A slurry containing such a humic-mineral agent, for example, dissolved humic-mineral agent, and liquid toxicant is created. High chemical reactivity of such a humic-mineral agent allows for such granules, for example, while being dissolved in a slurry, to react with and absorb and/or adsorb toxicants and/or heavy metals present in such a toxic liquid substance. A toxic liquid substance that such a humic-mineral agent may detoxify may comprise, for example, waste water and/or sewage.

For detoxification of solid toxicants such a solid humic-mineral agent may first be dissolved in water to create a slurry, for example, a homogenous slurry. After such a slurry is prepared, a solid toxicant may be added to such a slurry for detoxification. The mixture of such a slurry and a toxic solid may have a consistency between viscous-flowing liquid to dry or semi-dry. For a solid toxicant and/or a liquid toxicant, when such a humic-mineral agent is dissolved and mixed with such a toxicant, such a highly chemically active humic-mineral agent may react with one or more mobile forms of heavy metals and/or other toxicants. With heavy metals, such a reaction may result in conversion of such heavy metals into an immobile and insoluble state, forming, for example, small or large flock formations. Since such flock formations are insoluble in water they may be easily removed from a mixture in which they are contained by steps comprising addition of water followed by filtration, centrifugation, precipitation, etc. For example, about 48% (manganese) to about 95% (zinc, copper, cobalt, etc.) of heavy metals may be removed from such toxic material in a single treatment. Polycyclic and/or polychlorinated hydrocarbons may also be absorbed and/or adsorbed by humic acids and non-water-soluble parts of humic-mineral agents; for example, the rate of removal of polycyclic and/or polychlorinated hydrocarbons may be about 60% in a single treatment. Types of solid or semi-solid materials capable of being detoxified according to such a process may include, for example: contaminated soil, dewatered sewage sludge, dewatered bottom sediment, compost, manure, bottom and/or fly ash, metal bearing slag, and/or waste products from mining operations.

Many modifications and other embodiments of a process such as is described in various embodiments herein will come to mind to one skilled in the art to which this disclosed process pertains having the benefit of the teachings presented in the foregoing description. Therefore, it is to be understood that a process such as is described in various embodiments herein is not to be limited to the specific embodiments disclosed and that modifications and other embodiments are intended to be included within the scope of the appended claims. Although specific terms are employed herein, they are used in a generic and descriptive sense only and not for purposes of limitation.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "having," "containing," "involving," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedure, Section 2111.03.

Any result according to a process such as is described herein is an unexpected result. Any variable that may be inferred as being a result-effective variable according to a process such as is described herein is not recognized in the art to be a result-effective variable.

The foregoing description of methods and embodiments have been presented for purposes of illustration. It is not intended to be exhaustive or to limit the precise steps and/or forms disclosed, and obviously many modifications and variations are possible in light of the above teaching. It is intended that the scope and all equivalents be defined by the claims appended hereto.

The invention claimed is:

1. A process for preparing dry humic-mineral agent granules, the process comprising:
    providing a humic acid-containing material;
    crushing the humic acid-containing material to obtain first granules;
    contacting a quantity of water sufficient to prevent dust formation with the first granules, so as to form slightly wet granules;
    blending the slightly wet granules for a period of time, thereby forming blended granules;
    contacting an amount of alkali with the blended granules, thereby forming alkali-treated granules; and
    mixing the alkali-treated granules at a temperature high enough to melt organic carbon substances in the alkali-treated granules and evaporate excess water, thereby forming dry humic-mineral agent granules.

2. The process of claim 1, wherein the humic-containing material comprises coal and/or peat.

3. The process of claim 1, wherein the first granules have a median granule diameter of from about 1 to about 8 mm.

4. The process of claim 1, wherein the period of time is sufficient for water in the slightly wet granules to hydrate surfaces, cracks and/or capillaries of the slightly wet granules.

5. The process of claim 4, wherein the period of time is between about 2 and about 3 minutes.

6. The process of claim 1, wherein the alkali comprises sodium hydroxide, potassium hydroxide, or a mixture of sodium hydroxide and potassium hydroxide.

7. The process of claim 1, wherein the alkali consists of sodium hydroxide, potassium hydroxide, or a mixture of sodium hydroxide and potassium hydroxide.

8. The process of claim 1, wherein the amount of alkali is from about 4% to about 18% of the dry weight of the blended granules.

9. The process of claim 6, wherein the amount of alkali is from about 4% to about 18% of the dry weight of the blended granules.

10. The process of claim 7, wherein the amount of alkali is from about 4% to about 18% of the dry weight of the blended granules.

11. The process of claim 1, wherein the temperature high enough to melt organic carbon substances in the alkali-treated granules is at least about 76° C.

12. A process for preparing nutrient-delivering humic-mineral agent granules suitable for amelioration of soil and/or stimulation of plant growth, the process comprising:
    providing a humic acid-containing material;
    crushing the humic acid-containing material to obtain first granules;
    contacting a quantity of water sufficient to prevent dust formation with the first granules, so as to form slightly wet granules;
    blending the slightly wet granules for a period of time, thereby forming blended granules;
    contacting an amount of alkali with the blended granules, thereby forming alkali-treated granules;
    mixing the alkali-treated granules at a temperature high enough to melt organic carbon substances in the alkali-treated granules and evaporate excess water, thereby forming dry humic-mineral agent granules;
    contacting the humic-mineral agent granules with a granular nutrient-bearing substance, thereby forming a nutrient-bearing mixture; and
    blending the nutrient bearing mixture, thereby forming nutrient-delivering humic-mineral agent granules.

13. The process of claim 12, wherein the nutrient-bearing substance comprises ammonium nitrate, urea, ammonium sulfate, potassium nitrate and/or sodium nitrate.

14. The process of claim 12, wherein the nutrient-bearing substance comprises calcium phosphate, super phosphate, mono-di-three ammonium phosphate, sodium phosphate and/or potassium phosphate.

15. The process of claim 12, wherein the nutrient-bearing substance comprises potassium chloride, potassium nitrate and/or potassium sulfate.

* * * * *